Sept. 13, 1938.  H. W. DIETERT  2,130,269
HARDNESS TESTING INSTRUMENT
Filed Aug. 10, 1936
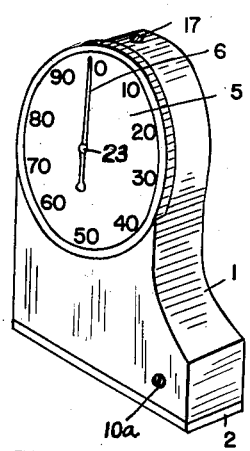
FIG.I.
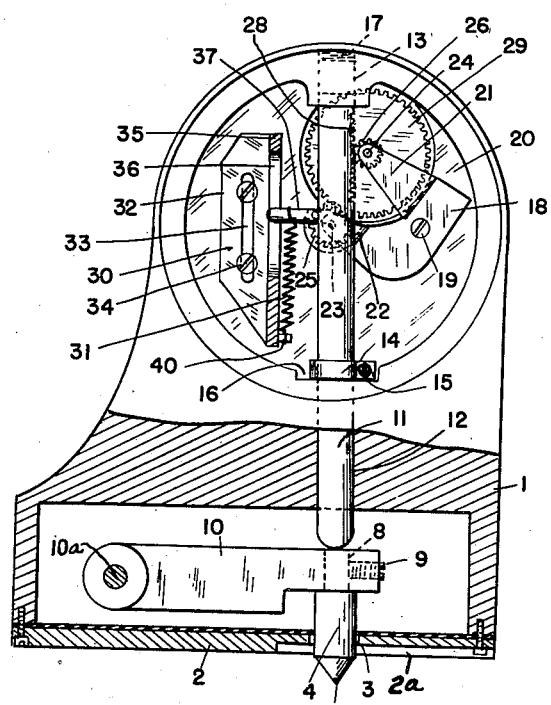
FIG.3.
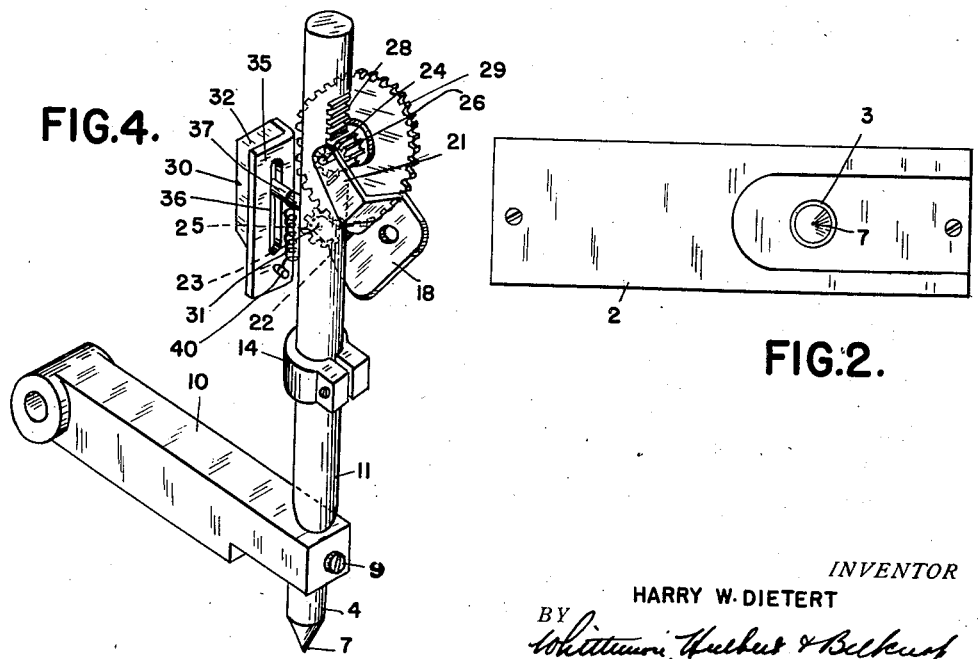
FIG.4.
FIG.2.
INVENTOR
HARRY W. DIETERT
BY
ATTORNEYS

UNITED STATES PATENT OFFICE 2,130,269

HARDNESS TESTING INSTRUMENT

Harry W. Dietert, Detroit, Mich.

Application August 10, 1936, Serial No. 95,303

4 Claims. (Cl. 265—12)

This invention relates generally to instruments and refers more particularly to a hand instrument for determining the skin hardness of baked sand cores, bearing metals, stones used for grinding purposes, and the like.

In the past, workmen in foundries have used their finger nails to scratch the baked cores to determine their skin hardness, and this, of course, has proven very unsatisfactory. Therefore, it is an object of the present invention to provide an instrument that is capable of measuring automatically and accurately the depth of the scratch in thousandths of an inch to determine the skin hardness of the articles being tested.

Another object is to provide an instrument wherein a spring load is applied to a diamond point to accomplish the results desired.

Another object is to provide a handy instrument that is self-contained and compact, and that may be readily manipulated.

Other objects, advantages and novel details of construction of this invention will be made more apparent as this description proceeds, especially when considered in connection with the accompanying drawing, wherein:

Figure 1 is a perspective view of an instrument embodying my invention;

Figure 2 is a bottom plan view thereof;

Figure 3 is a vertical sectional view through the instrument;

Figure 4 is a perspective view of the mechanism actuable by the tool for operating the pointer.

Referring now to the drawing, 1 is a casing having a removable base 2 provided with an opening 3 for a reciprocating work-engaging tool 4, and having a dial 5 at one side thereof over which a pointer 6 is movable to indicate the skin hardness of the material engaged by the tool. Preferably this tool 4 has a diamond point 7 for engagement with the work and has a reduced shank 8 connected by a set screw 9 to the free end of a lever 10 that is mounted at its other end upon a pivot 10a within the casing. 11 is a plunger in line with the tool and actuable by the lever 10 for translating motion to suitable mechanism within the casing for actuating the pointer 6. Preferably this plunger 11 slidably engages vertically spaced bearing portions 12 and 13 respectively of the casing.

Referring now to the pointer actuating mechanism, 14 is a collar clamped on the plunger 11 and engageable with the base 15 of a recess 16 in the casing to limit downward movement of the plunger, while a removable plug 17 in the bearing 13 is engageable by the upper end of the plunger to limit upward movement of the plunger. 18 is a bracket fastened by a screw 19 to a wall 20 of the casing and having offset arms 21 and 22 respectively, substantially parallel to said wall 20. Shafts 23 and 24 respectively are journaled in said arms and carry pinions 25 and 26. The shaft 23 also carries the pointer 6. As shown, pinion 26 meshes with a rack 28 integral with the plunger 11, while the pinion 25 meshes with a gear 29 rigid with the shaft 24. Thus, sliding movement of the plunger 11 causes pinion 26 to turn shaft 24, with the result that gear 29 on said shaft will cause pinion 25 to turn shaft 23 carrying the pointer 6.

For controlling the downward force of the plunger 11, I have provided an adjustable angle bar 30 and a coil spring 31. Preferably one web 32 of the angle bar has an elongated slot 33 therein receiving vertically spaced screws 34, while the other web 35 of said bar has an elongated slot 36 therein receiving a laterally projecting pin 37 on the plunger 11. The coil spring 31 is terminally connected to the pin 37 and to a pin 40 projecting laterally from the web 35 of the angle bar. Thus, adjustment of the bar 30 varies the tension of the spring 31 and hence the action of the plunger 11.

In use the base 2 of the casing is placed flat against the surface to be tested and is then slid over said surface so that the diamond point 7 will scratch the same. When this is done, the plunger 11 will move downwardly, depending upon the depth of the scratch and, accordingly, will cause the pinion 26, gear 29 and pinion 25 to function so that the depth of the scratch made by said point 7, depending upon the skin hardness of the material being tested, will be recorded by the pointer 6 on the dial. To accommodate grains of sand or other particles separated from the specimen being tested by the diamond point 7 during the scratching operation, the base 2 has an elongated groove or channel-shaped recess 2a that extends lengthwise of the base from a point slightly in advance of the tool 4 to the rear edge of the casing 1.

In the present case suitable adjustments are provided for calibration so that a definite load on the tool 4 can be obtained. For example, during continued use, the point 7 will wear. To compensate for this wear, the base 2 of the casing is pressed flat against a hard plane surface. Should pointer 6 fail to point to zero (0) on the dial 5, the latter is turned on the casing until pointer is at zero (0). The spring 31 applies the load to plunger 11 and movement of the latter is controlled by the characteristics of the specimen being tested. The tension of spring 31 is adjusted by moving bar 30 until the load on the tool 4 is equal to predetermined value. The collar 14 is so placed on plunger 11 that it will cause point 7 to extend a predetermined distance from the base 2 of the casing. Thus, when my device is slid over the surface of the test specimen a predetermined loaded point 7 will scratch the said surface and the depth of such scratch is indicated on the dial 5 by the pointer 6 which is responsive to the action of the tool 4. The reading on the dial is taken as the measure of hardness of the specimen surface being tested.

What I claim as my invention is:

1. An instrument for measuring the skin hardness of articles, comprising a casing having a base for sliding engagement with the surface of an article to be tested, a predetermined loaded scratching element projecting through the base and operable when said base is slid over the article to scratch the surface thereof to be tested, and means at one side of the casing responsive to the action of the scratching element for indicating the depth of scratch so made.

2. An instrument for measuring the skin hardness of articles, comprising a casing having a substantially flat base for surface to surface contact with an article to be tested, said base being slidable upon said article and having an opening therethrough, a predetermined loaded scratching element movable in the opening in said base and operable when said casing is slid over said article to scratch the surface of the article to be tested, a dial upon one side of the casing, and means movable over the dial and responsive to the action of the scratching element for indicating the depth to which the article is scratched.

3. An instrument for measuring the skin hardness of articles, comprising a casing having a base for sliding engagement with the surface to be tested, said base having an opening therethrough, a predetermined loaded scratching element projecting through the opening in the base and operable when the base is slid over the surface to be tested to scratch the said surface, said scratching element being movable inwardly and outwardly automatically in the opening in the base as the latter is slid over the surface to be tested depending upon the skin hardness of said surface, and means carried by the casing responsive to the action of the scratching element for indicating the depth of scratch so made.

4. An instrument for measuring the skin hardness of articles, comprising a casing having a base for sliding engagement with the surface of an article to be tested, a predetermined loaded scratching element projected through the base and operable when said base is slid over the article to scratch the surface thereof to be tested, the base of said casing being provided with a passageway for loose grains or particles separated from the article by the scratching element during the scratching action thereof, and means carried by the casing responsive to the action of the scratching element for indicating the depth of scratch so made.

HARRY W. DIETERT.